United States Patent [19]
Schindler

[11] Patent Number: 6,015,222
[45] Date of Patent: Jan. 18, 2000

[54] LIGHT FIXTURE WITH SNAP-IN COMPONENTS

[75] Inventor: John W. Schindler, Huntington, Ind.

[73] Assignee: Tekonsha Engineering Company, Tekonsha, Mich.

[21] Appl. No.: 08/985,945

[22] Filed: Dec. 5, 1997

[51] Int. Cl.[7] .................................................. B60Q 3/02
[52] U.S. Cl. ........................ 362/490; 362/307; 362/311
[58] Field of Search .................................. 362/490, 307, 362/311, 310, 514, 516, 512, 546, 549, 519, 544

[56] References Cited

U.S. PATENT DOCUMENTS

| | | | |
|---|---|---|---|
| D. 304,088 | 10/1989 | Kelley et al. | D26/24 |
| D. 315,216 | 3/1991 | Kelley et al. | D26/28 |
| D. 326,926 | 6/1992 | Stephenson et al. | D26/74 |
| D. 339,203 | 9/1993 | Namenye et al. | D26/85 |
| 2,116,750 | 5/1938 | Dashner | 362/490 |
| 3,501,599 | 3/1970 | Horecky | 200/16 |
| 3,514,010 | 5/1970 | Rossi | 362/490 |
| 3,792,250 | 2/1974 | Kilbourn et al. | 240/7.1 |
| 3,833,784 | 9/1974 | Bobel et al. | 200/157 |
| 4,128,745 | 12/1978 | Marsilio et al. | 200/16 C |
| 4,285,033 | 8/1981 | Hart | 362/295 |
| 4,316,067 | 2/1982 | Whiteman, Jr. | 200/291 |
| 4,404,619 | 9/1983 | Ferguson | 362/222 |
| 4,872,099 | 10/1989 | Kelley et al. | 362/295 |
| 4,930,056 | 5/1990 | Stephenson et al. | 362/364 |
| 5,070,434 | 12/1991 | Suman et al. | 362/490 |
| 5,272,610 | 12/1993 | Namenye et al. | 362/351 |
| 5,441,339 | 8/1995 | Mathias et al. | 362/490 |

*Primary Examiner*—Thomas M. Sember
*Attorney, Agent, or Firm*—Price, Heneveld, Cooper, DeWitt & Litton

[57] ABSTRACT

A surface-mounted light fixture having a housing adapted to receive and retain the main operating components by a snap-in connection, without using mechanical fasteners. In one embodiment, the operating components so mounted include a mounting bracket for a light-emitting element, e.g., a light bulb, a reflective plate for dispersing light generated by the light-emitting element, a switch for activating the light-emitting element and a lens for covering the same. The housing is molded from a polymeric material so that it may be conveniently mounted to a target surface, preferably the interior of a recreational vehicle. Integral with the housing, are a plurality of resilient and rigid tabs which provide the snap-in mounts, for efficient assembly along a high-volume assembly line. Even though separate fasteners are not required, the integrity of the mechanical connections between the components of the light fixture is high, thus minimizing rattling when used in a vibrating environment. In another embodiment, the housing is adapted for retaining multiple light-emitting elements which may be independently activated.

19 Claims, 5 Drawing Sheets

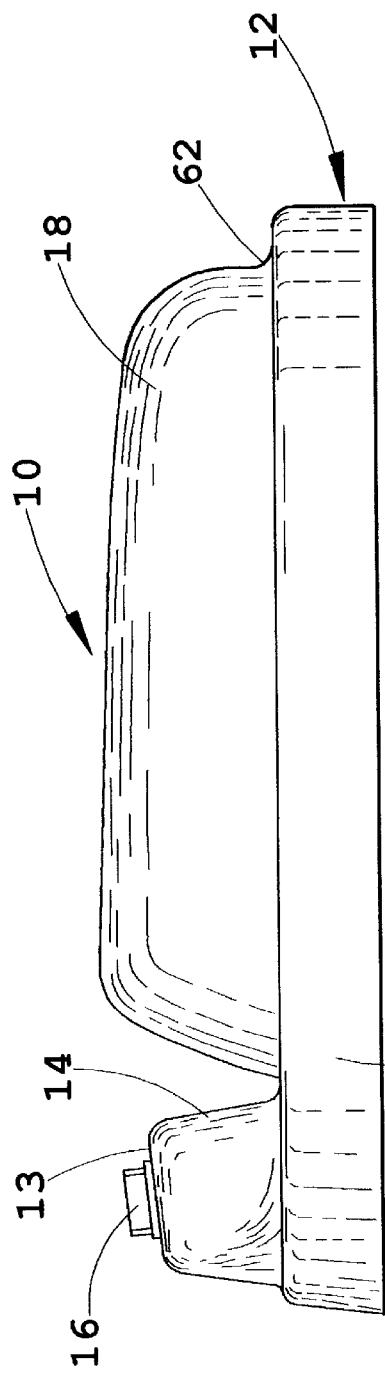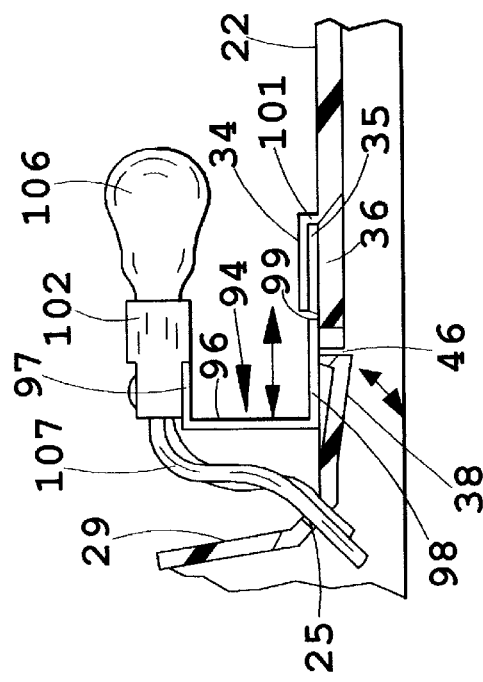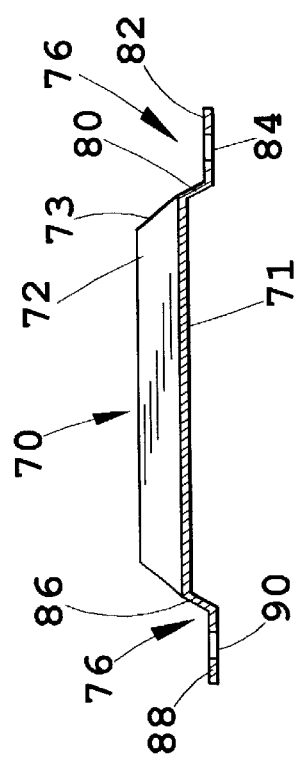

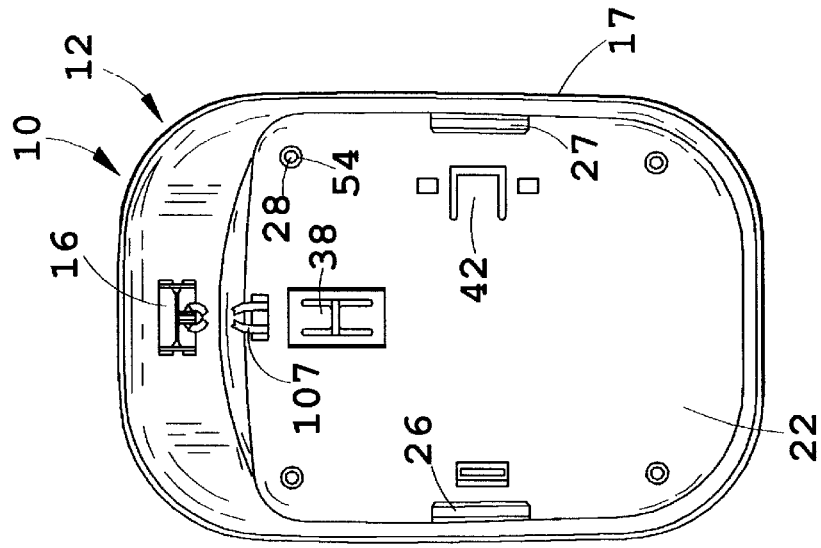
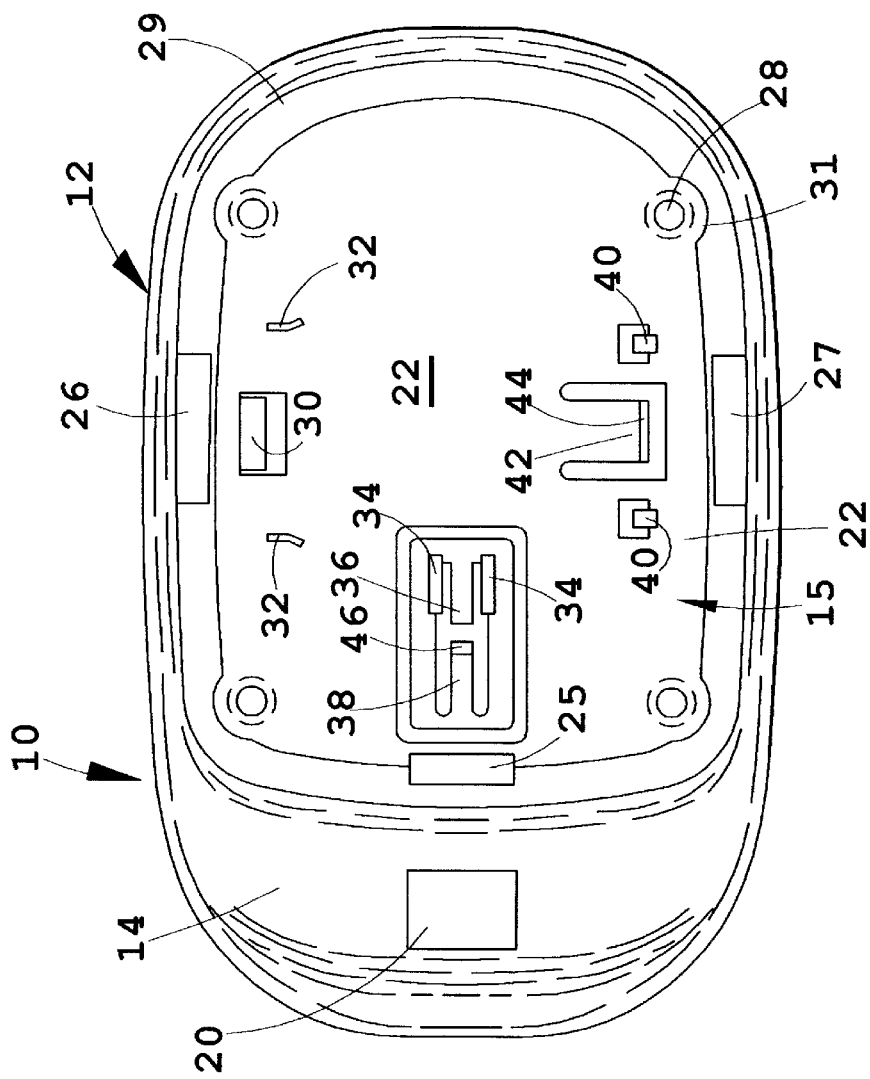
FIG. 4
FIG. 3

LIGHT FIXTURE WITH SNAP-IN COMPONENTS

BACKGROUND OF THE INVENTION

1. Field of the Invention

The instant invention relates to the field of surface-mounted light fixtures and particularly to light fixtures comprised of components that can be snapped together or onto their mounts for easy and cost-effective assembly/disassembly.

2. Discussion of Related Art

Surface-mounted light fixtures are particularly useful in applications where space is limited and easy access to the components of the fixture is desired, as within the interior of a recreational or other vehicle. Typically, the components of the light fixture are permanently or semi-permanently attached to each other, making assembly/disassembly difficult or even impossible.

In general, such light fixtures have a housing with a relatively flat backside, a light-emitting element such as a bulb, a holder or mount for the bulb, one or more operator switches, a lens for protection and light dispersion, and fasteners to mount the components or to secure them to one another. The housing typically has a detachable back plate that may have a reflective surface to disperse the light generated by the bulb. Further, to affix the light fixture to a target surface, the housing usually has a series of mounting receptacles that accommodate fasteners for installation. In some of these fixtures, the bulb, the switch, the bulb mount, and the lens have a snap-fit relationship with the housing, i.e., no separate mechanical fastening element is necessary.

One known type of light fixture having components that are snapped together has a housing made of a molded polymeric material that is adapted to accommodate a lens likewise made from a molded polymeric material and appropriately sized to fit the housing. Further, the lens has a series of tabs sized to engage openings around the rim of the housing for securing the lens to the housing. In this fixture, the lens and the tabs molded thereto are essentially rigid, thus making the lens susceptible to breakage when it is assembled/disassembled. Also, further adding to its complexity, the bulb of this fixture is mounted to a bracket that is secured with a fastener, e.g., a screw and a nut, to an independent and removable back plate. The back plate is made entirely from metal, thus providing a reflective surface for light dispersion and the housing has mounting receptacles molded integrally thereto for supporting the back plate and securing the light fixture to a target surface. However, because the metal back plate merely rests on the mounting receptacles when it is secured to the target surface, the light fixture is susceptible to rattling; obviously, an undesirable feature considering the contemplated use of the light fixture in a recreational vehicle. In addition, this light fixture does not include a separate switch to activate the bulb, thus further limiting its versatility.

In another type of light fixture having components that are snapped together, the fixture has a housing made from a polymeric material that is adapted to accommodate a lens. The lens is likewise made from a polymeric material and has a series of tabs around its lower edge for engaging corresponding openings in the rim of the housing. Further, to aid assembly/disassembly of the fixture, the lens is made slightly flexible so that it may be readily snapped to the housing. However, the lens has a separate rim that extends along the outer peripheral edge of one end of the lens that must be fed into a groove in the housing in sliding fashion, thus making assembly/disassembly difficult. This is a particular problem during initial assembly of the light fixture when it is important to assemble a great number of units in a short amount of time, e.g., along a high-volume assembly line. In addition, similar to other known light fixtures, this fixture has a metal back plate that is connected to the housing with a separate fastener. The back plate also has a separate structure for permanently securing the bulb mounting bracket to the back plate with a fastener and, although it is metal, it does not contain a reflective surface to disperse the light. This fixture does incorporate a switch but, overall, it is difficult to assemble, contains a bulky metal back plate that is non-reflective, and must be separately secured to the housing with a fastener.

Therefore, a light fixture is desired that has a self-contained housing adapted to retain only snap-in type components for easy assembly/disassembly. In particular, the housing should accommodate a snap-in type lens, a snap-in type switch, a snap-in type bracket for mounting the light-emitting element, and a snap-in type reflective plate for attachment directly to a portion of the self-contained housing, i.e., without a separate back plate. Such a system will be relatively inexpensive to manufacture and designed for relatively easy manual assembly along a high-volume assembly line. Further, when assembled, the mounting integrity and interconnection of the mechanical components in the system should not be compromised by jarring motion of the fixture when it is used in a vibrating environment.

SUMMARY OF THE INVENTION

The light fixture of the present invention provides a solution to the above-known types of light fixtures having components which may be snapped to each other. The housing of the instant light fixture is preferably a one-piece component that is molded to conform to the various types of surfaces to which it may be anchored including, in the preferred embodiment, the interior of a recreational vehicle. The fixture also includes a light-emitting element, e.g., a bulb and a reflective plate for dispersing the light generated by the bulb. In addition, the light fixture has a manually-operated switch with a snap-in type mount, a snap-in type bulb mount, and a snap-in type transparent or semi-transparent lens for dispersing and diffusing the light emitted into the interior of the vehicle and for protecting the light-emitting element.

In the most preferred embodiment of the invention, the housing is made entirely from a polymeric material, and has an upwardly-extending portion at one end, a dish-shaped portion adjacent thereto and an annular wall extending around its perimeter. The upwardly-extending portion has an opening that is sized to accommodate and frictionally retain the switch while the annular wall has a generally planar surface that has a series of apertures around its perimeter to receive fasteners used to mount the housing to a target surface such as a bulkhead. Further, the dish-shaped portion has an angled wall that has a series of openings that are sized to engage and retain tabs extending outwardly from the rim of the lens. Therefore, separate fasteners are not required to connect the lens to the housing, i.e., the lens and the housing have a snap-in relationship.

Further, the generally planar annular surface of the housing has a series of rigid and resilient tabs integrally molded with the housing that collectively operates to retain the bulb mounting bracket and the reflective plate. To secure the bracket to the housing, the bracket is placed flat against one of the resilient tabs and pushed into the tab. As a result, the resilient tab flexes downwardly into the open underside of the shell-shaped housing. By sliding the bracket toward the rigid tabs on either side of the bracket, the bracket engages slots in the rigid tabs and, when fully inserted, the resilient tab is released to prevent the bracket from sliding outwardly from the rigid tabs. Therefore, the mounting bracket is tightly secured to the housing without a separate fastening element and with minimal effort by the assembler.

The generally planar annular surface of the housing contains a second set of rigid tabs and another resilient tab that collectively operates to retain the reflective plate to the planar surface. The reflective plate contains a base that is generally flat and has portions extending from its perimeter edges. The reflective plate contains two flange portions, opposite each other, that extend downwardly and outwardly and are adapted to engage the second set of rigid and resilient tabs. This set of tabs anchor the reflective plate to the housing and hold the reflective plate, which may get hot, away from the generally planar surface of the housing. In this configuration, the reflective plate is located above the bulb mounting bracket but below the bulb, thus maximizing the use of limited space while achieving optimum light dispersion. Also, in the preferred embodiment, the reflective plate has two flange portions, opposite each other, that extend upwardly and outwardly from the planar surface of the housing and toward the bulb to reflect light toward the lens.

The fixture also includes a bowl-shaped lens molded from a polymeric material that has a rim and a plurality of tabs integrally molded thereto. These tabs are designed to engage the openings in the angled wall of the dish-shaped portion, thus securing the lens to the housing without a separate fastener. The lens is at least slightly resilient so that when it is squeezed from either side, inserted into the dish-shaped portion of the housing, and then released, the lens tabs will engage the openings in the angled wall of the housing and provide a relatively tight self-retaining fit between the perimeter of the lens and the housing.

In an alternative embodiment, the housing has a second dish-shaped portion extending from the opposite side of its upwardly-extending portion for accommodating a second light-emitting element. This embodiment is useful when additional light is desired and when only one side of the space being lit requires lighting, each light-emitting element having a switch for manual activation.

As such, by providing a self-contained housing having a plurality of tabs or the like integrally molded thereto which retain the components of the system, the light fixture of the instant invention is relatively inexpensive to manufacture, lightweight, and can be assembled with little effort. Further, because each of the components, including the bulb mounting bracket, the reflective plate, and the lens may be "snapped" into place inside the housing, manual assembly of the light fixture can be efficiently completed along a high-volume assembly line. Even though separate fasteners are not used, the light fixture of the instant invention exhibits essentially zero rattling when mounted in a vibrating environment because the snap-in connections are resiliently biased and secure, a particularly advantageous feature considering that the light fixture is, in the preferred embodiment, mounted within the interior of a recreational vehicle.

These and other features, advantages and objects of the present invention will be further understood and appreciated by those skilled in the art by reference to the following specification, claims and appended drawings.

BRIEF DESCRIPTION OF THE DRAWINGS

FIG. 2 is a side view of the light fixture shown in FIG. 1;

FIG. 3 is a top plan view of the housing of the light fixture;

FIG. 4 is a bottom plan view of the lens of the light fixture;

FIG. 5 is a cross-sectional end view of the reflective plate;

FIG. 7 is a fragmentary cross-sectional side view taken along the plane VII—VII of FIG. 6, showing the bulb mounting bracket and corresponding deflectable tab during assembly;

DETAILED DESCRIPTION OF PREFERRED EMBODIMENT

Figure 1:
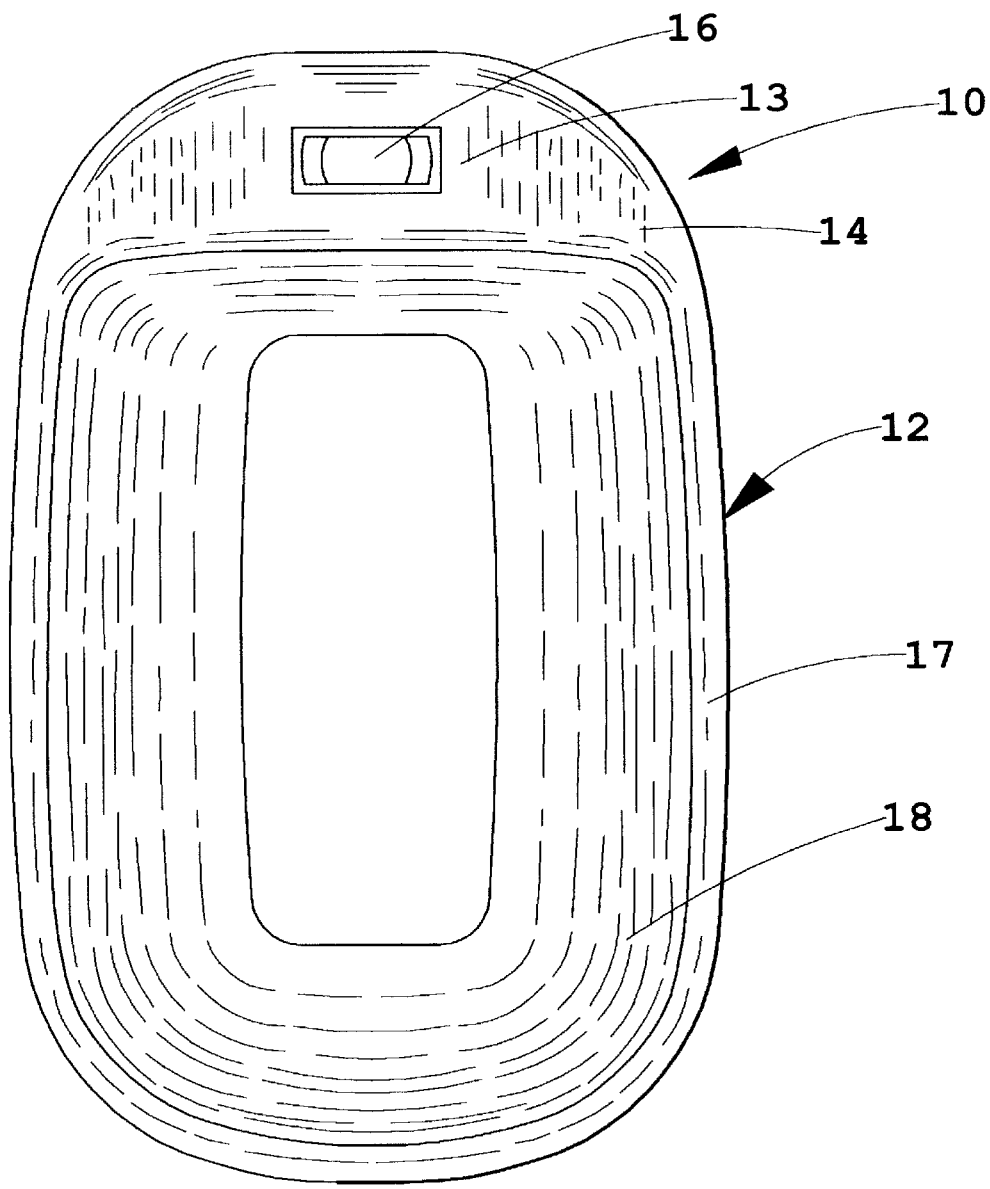
FIG. 1 is a top view of the light fixture embodying the present invention.

With reference to FIGS. 1, 2, and 3, an exemplary light fixture 10 includes a polymeric housing 12 having a perimeter wall 17, an upwardly-arching portion 14 extending across the housing from opposite sides thereof, and a dish-shaped portion 15 adjacent thereto sized to accommodate a lens 18. The upwardly-arching portion 14 of housing 12 has a flat surface 13 with an opening 20 that is sized to accommodate a switch 16.

Referring further to FIG. 3, housing 12 of light fixture 10 is shown with switch 16 and lens 18 removed. In this embodiment, opening 20 in arching portion 14 of housing 12 is adapted to receive a switch that has a rectangular base. Dish-shaped portion 15 has a generally planar bottom surface 22 that has a series of apertures 28 near its outer edges that accommodate fasteners (not shown) for connecting housing 12 to a mounting surface.

Figure 8A:
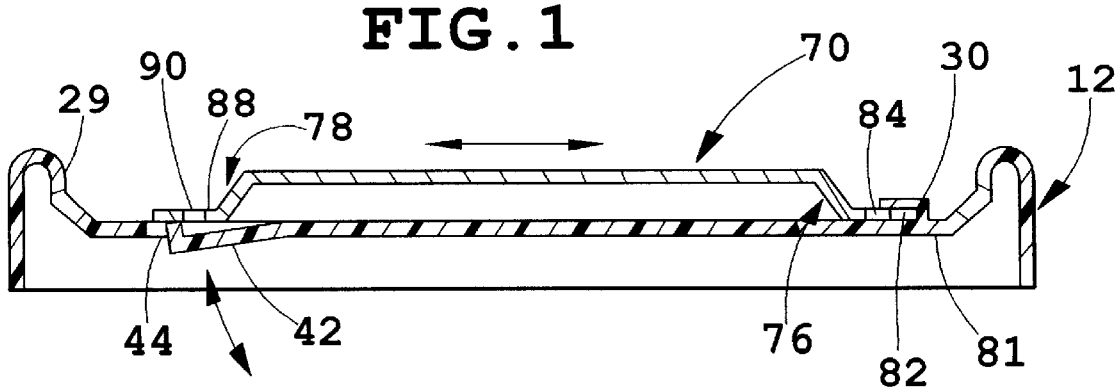
FIG. 8a is a fragmentary cross-sectional end view taken through the plane VIII—VIII of FIG. 6, showing a first position of the reflective plate with respect to the housing and corresponding deflectable tab during assembly.

As shown in FIGS. 3, 7, and 8a/8b, integral with the generally planar bottom surface 22 of dish-shaped portion 15 is an angled wall 29 that is formed between planar bottom surface 22 and both upwardly-arching portion 14 and an annular rim 24. Angled wall 29 has at least one and preferably two openings 26, 27 sized to receive the snap-in portion (described below) of lens 18, and also has an opening 25 through which the wiring used to connect switch 16 to a light-emitting bulb 106 or other such element (shown in FIG. 6) passes. Also, angled wall 29 has circular notches 31 corresponding to apertures 28 in planar bottom surface 22 of dish-shaped portion 15, so that an enlarged fastener with a head may be used to connect housing 12 of the light fixture to a mounting surface.

Figure 6:
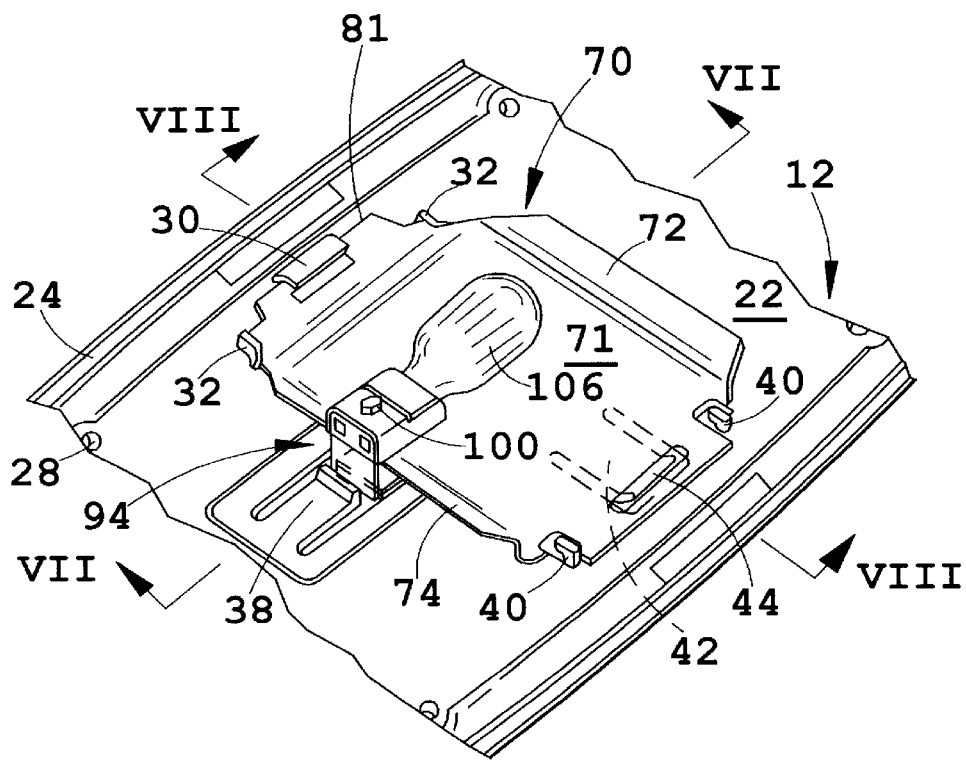
FIG. 6 is a fragmentary top perspective view of the light fixture of FIG. 1, without the lens, showing the internal components mounted in place.
Figure 8B:
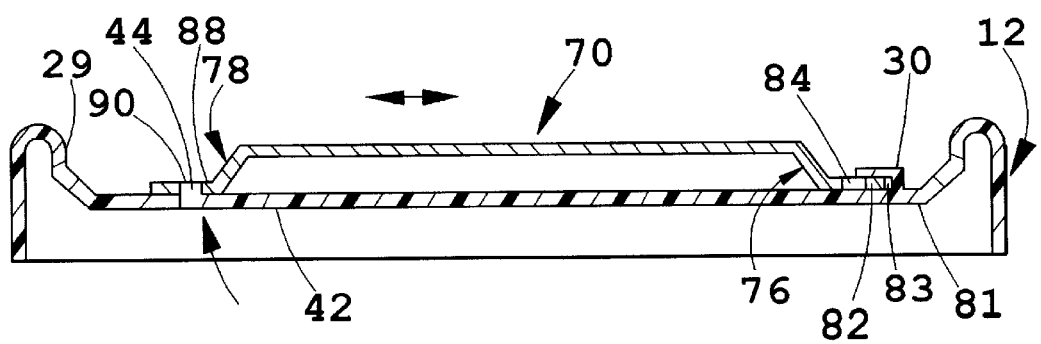
FIG. 8b is a fragmentary cross-sectional view like FIG. 8a but showing a second position of the reflective plate with respect to the housing and corresponding deflectable tab, following lateral movement during assembly, showing the deflectable tab engaging the reflective plate.

To further aid assembly/disassembly of the components, planar bottom surface 22 of housing 12 has a series of tabs or brackets 30, 32, 40, and 42 molded integrally therewith (shown in FIGS. 3, 6, 7, and 8a/8b and described below) for connecting reflective plate 70 to housing 12. As best shown in FIGS. 6 and 8, tab 30 is a rigid L-shaped tab that extends away from and partially parallel to planar bottom surface 22, to retain one end of reflective plate 70 in place atop planar bottom surface 22, while tabs 32 prevent sideways movement of reflective plate 70 parallel to planar bottom surface 22 to insure that reflective plate 70 does not slide out from under rigid tab 30. Tab 42, which normally lies in the plane of bottom surface 22, is a resilient member defined by a pair of parallel slots in bottom surface 22 and having a lip 44 positioned to engage the opposite end of reflective plate 70. As shown in FIG. 8a, when end portion 82 of plate 70 is fully inserted under tab/bracket 30, the opposite end 88 of plate 70 bears downwardly against resilient tab 42 to deflect it downward. This permits plate 70 to be slid back along surface 22 in the opposite direction until lip 44 may engage aperture 90 in end portion 88 of plate 70 (FIG. 8b), whereupon tab 44 springs back upward into the plane of surface 22. This locks plate 70 in place upon surface 22, since the tabs 40, which extend away from and partially parallel to planar bottom surface 22, then overlie the adjacent end of hold reflective plate 70 and hold it in place atop bottom surface 22 by preventing movement of plate 70 away from planar bottom surface 22.

In addition to the tabs 30, 32, 40, and 42 mentioned above, planar bottom surface 22 also has a set of tabs 34, 36, and 38 (shown in FIGS. 3, 6, and 7) which are designed to engage light-emitting element mounting bracket 94 and hold it in place upon bottom surface 22. When bracket 94 is fully inserted under the pair of parallel L-shaped tabs 34, tab 36 projects under and provides additional support for bracket 94 while upward reflex movement of resilient tab 38 brings its lip 46 directly behind bracket 94 to prevent it from sliding back outwardly and disengaging from side tabs 34, 38 (compare FIGS. 6 and 7).

FIG. 4 depicts the underside of housing 12 with switch 16 mounted in the upwardly-arching portion 14. Apertures 28 extend through elongated collars 54 that are molded to planar surface 22, parallel to perimeter wall 17, and which surround and, therefore, support at least a portion of the shank of the screws or other fasteners used to mount the fixture to a wall or the like. Perimeter wall 17 and receptacles 54 hold the underside of generally planar surface 22 of housing 12 away from the surface on which it is mounted, thus leaving a space between such surface and the underside of planar surface 22. Therefore, the component parts, including reflective plate 70 and bracket 94 for the light-emitting element, can be easily assembled/disassembled with respect to housing 12 because deflectable tabs 38, 42 that retain these components are permitted to extend into the space between the mounting surface and the underside of generally planar surface 22, allowing mounting bracket 94 and reflective plate 70 to be withdrawn. Further, when assembled, the reflective plate is positioned between the housing and the light-emitting element to insure the housing is exposed to a minimum amount of heat that is generated by the light-emitting element.

With reference to FIGS. 1, 2, and 3, lens 18 has an annular rim 62 that, when connected to housing 12, tightly engages angled annular wall 29. Lens 18 has, in the preferred embodiment, two generally rigid tabs 60 that are shaped to engage openings 26, 27 in angled annular wall 29. Also, lens 18 is made from a stiffly flexible and resilient lightweight polymeric material that makes mounting of lens 18 to housing 12 relatively easy without compromising the integrity of the mechanical connection between the two.

To connect lens 18 to housing 12, an assembly line worker squeezes the sides of lens 18 and places lens 18 in dish-shaped portion 15 of housing 12 so that tabs 60 are aligned with against angled annular wall 29 of dish-shaped portion 15 to provide a tight connection between lens 18 and housing 12 without separate fasteners. Overall, lens 18 has a relatively high heat tolerance to prevent it from melting due to exposure to the heat generated by the light-emitting element, and is typically "frosted" to soften and disperse the light generated by the light-emitting element.

Reflective plate 70 is shown in FIGS. 5 and 6 as being symmetrical from side-to-side and end-to-end, having a flat and generally rectangular main body 71 and, in the preferred embodiment, a pair of mutually opposed flange sections 72, 74 extending from opposite sides of body 71. Flange sections 72, 74 are angled upwardly from the plane defined by body 71, and have tapered side edges 73 for optimum light dispersion. Reflective plate 70 also has a pair of oppositely disposed end flange portions 76, 78 that are designed to engage rigid tabs 30, 32, and 40 of dish-shaped portion 15 of housing 12. Flange portions 76, 78 have sections 80, 86 that extend angularly downwardly from the plane defined by body 71 of reflective plate 70 to raise body 71 above planar surface 22 of housing 12. In addition, flange portions 76, 78 have outwardly extending portions 82, 88 that are attached to sections 80, 86, are parallel with body 71, and have openings 84, 90, respectively, that are sized so that either may receive lip 44 of deflectable tab 42 (depending upon which end of plate 70 happens to be located there, plate 70 being equally usable in either endwise orientation due to its symmetrical shape) (FIG. 8b), to thereby hold reflective plate 70 in place upon housing 12. When installed, sections 80, 86 and portions 82, 88 hold body 71 of reflective plate 70 away from (i.e., spaced above) generally planar bottom surface 22 of dish-shaped portion 15 of housing 12. Because reflective plate 70 is symmetrical and lip 44 of deflectable tab 42 may engage either of openings 84, 90, quick and easy assembly of light fixture 10 is facilitated. Also, reflective plate 70 is preferably made entirely of a reflective metal for maximum light dispersion and, when connected, reflective plate 70 prevents light-emitting element 106 from melting housing 12, housing 12 being made of a polymeric material.

Referring to FIGS. 6, 7, and 8a/8b, reflective plate 70 and mounting bracket 94 for the light-emitting element are shown assembled to housing 12. As best shown in FIGS. 6 and 8a, to connect reflective plate 70 to housing 12, the assembler first places outwardly extending portion 82 of flange 76 under rigid tab 30 and between a pair of rigid tabs 32 that extend upwardly from bottom surface 22 of housing 12. Then, outwardly extending portion 82 is pushed under tab 30 until its outer edge 81 contacts the upwardly-extending portion of tab 30. As a result, rigid tab 30 prevents movement of reflective plate 70 away from planar surface 22, while rigid tabs 32 prevent sliding movement of reflective plate 70 along planar surface 22 by engaging the sides of its flange portion 76.

Thereafter, outwardly extending portion 88 is placed flush against planar surface 22 of housing 12 so that its bottom surface contacts lip 44 of deflectable tab 42 (FIG. 8a). By doing so, deflectable tab 42 is deformed downwardly into the space between the mounting surface and the underside of generally planar surface 22. Because of its resiliency, deflectable tab 42 presses upwardly against the bottom surface of outwardly extending portion 88, thus generating a force between lip 44 and the underside of outwardly extending portion 88. As the assembler slides reflective plate 70 toward rigid tabs 40, lip 44 of deflectable tab 42 "snaps"

upward into opening 90 of outwardly extending portion 88 (FIG. 8b) to secure flange 78 to housing 12. Although this sliding of plate 70 toward tabs 40 moves the opposite end 82 away from tab/bracket 30 somewhat (shown by clearance opening 83 in FIG. 8b), the top of rigid tabs 40 still overhangs end 82 to prevent movement of flange 76 of reflective plate 70 away from planar surface 22 of housing 12.

With continuing reference to FIGS. 6 and 7, after reflective plate 70 has been assembled to housing 12, mounting bracket 94 of light-emitting element 106 is attached in a similar manner. Mounting bracket 94 contains three sections including a main section 96, a support section 97, and a base section 98. Main section 96 extends upwardly, generally perpendicular to planar bottom surface 22 of dish-shaped portion 15 of housing 12 when assembled, while support section 97 and base section 98 extend perpendicular to either end of the main section.

Support section 97 holds a socket 102 for light-emitting element 106. In particular, socket 102 is secured to support section 97 with a fastener 100, such as rivet 100 shown in FIG. 6. Note that socket 102 has an open end adapted to retain light-emitting element 106 and an opposite end adapted to receive and retain wiring 107 for electrically connecting light-emitting element 106 to switch 16. Similar to the process for connecting reflective plate 70 to housing 12, to connect bracket 94 to housing 12, the bottom surface of base section 98 of mounting bracket 94 is placed against deflectable tab 38, thus forcing deflectable tab 38 into the space between the bottom surface of generally planar portion 22 and the adjacent surface of the wall or other such structure to which the fixture is to be mounted. As a result, due to the resiliency of deflectable tab 38, lip 46 of deflectable tab 38 exerts a force on the bottom surface of base section 98 of mounting bracket 94.

Then, the assembler moves mounting bracket 94 toward elongated rigid tabs 34 molded to planar bottom surface 22 until open edge 99 (FIG. 7) of base section 98 of mounting bracket 94 engages slots 35 formed in tabs 34. By sliding mounting bracket 94 further into slots 35 of rigid tabs 34, open edge 99 of base section 98 contacts closed end 101 of slots 35. In this fully inserted position, the bottom surface of base section 98 lies adjacent to a deflectable support tab 36 and no longer contacts lip 46 of deflectable tab 38. Therefore, deflectable tab 38 is released and lip 46 then lies adjacent to main section 96 of mounting bracket 94 to prevent mounting bracket 94 from sliding out from between elongated rigid tabs 34.

Figure 9:
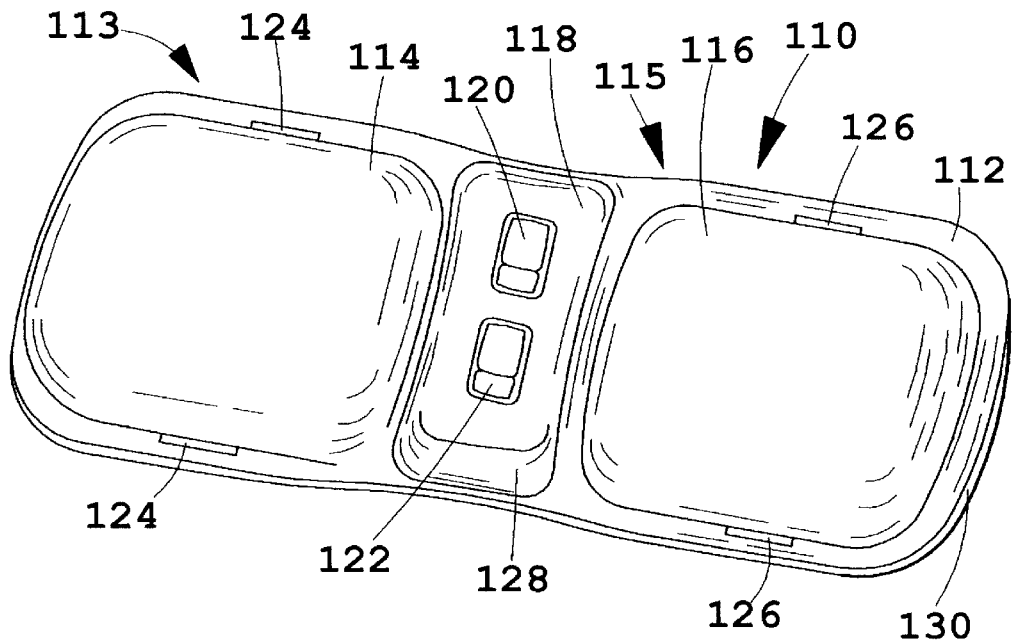
FIG. 9 is a perspective view of an alternate embodiment of the light fixture incorporating a dual light configuration.
Figure 10:
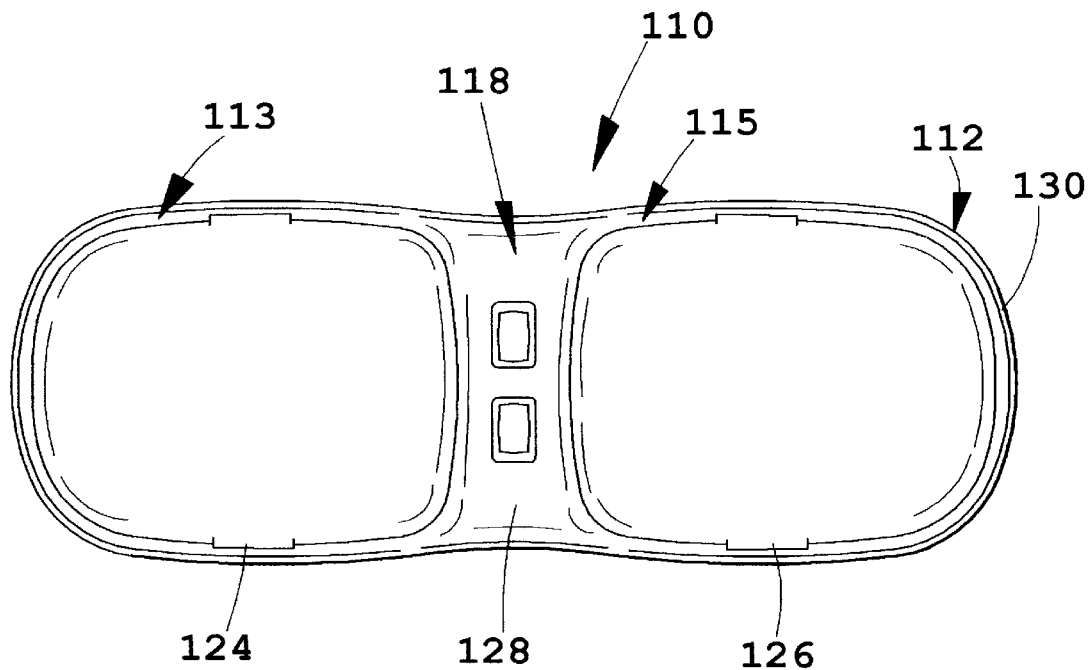
FIG. 10 is an overhead plan view showing the structure of FIG. 9.

An alternate embodiment 110 of the light fixture is shown in FIGS. 9 and 10, which includes a housing. 112 adapted to retain two light-emitting elements. Similar to the previous embodiment, housing 1 12 has an underside that is at least partially open and has a perimeter wall 130. In addition, similar to housing 12 of the previous single-light embodiment 10, housing 112 has two dish-shaped portions 113, 115 and an integrally molded central upwardly-arching portion 128. Central upwardly-arching portion 128 has a generally flat top or outer surface 1 18 that has two openings formed therein that are sized to accommodate switches 120, 122. Each dish-shaped portion 113, 115 has at least one opening 124, 126 around its perimeter that is shaped to accommodate a deformable and resilient polymeric lens 114, 116. Each lens 114, 116 has at least one tab around its perimeter that is designed to engage the corresponding openings around the perimeter of dish-shaped portions 113, 115. As in the previous embodiment, all the components of the light fixture may be "snapped" onto the housing for quick and inexpensive assembly of the fixture along an assembly line. Of course, any number of dish-shaped portions could be integrally molded to one another to accommodate multiple individually activated light-emitting elements.

All of the components of the instant light fixture including the switch, the mounting bracket for the light-emitting element, the reflective plate, and the lens can be quickly mounted on the housing, thus allowing efficient assembly of the primary components of the light fixture along a high-volume assembly line. In addition, by utilizing deflectable and resilient tabs that are molded integrally with the housing, separate fasteners for connecting the primary fixture components are unnecessary. Because of their relative shapes and structural features, the housing and its components are not only readily assembled but the integrity of the mechanical connection between the components is secure and self-maintained. In sum, the construction of the light fixture of the instant invention makes it inexpensive to manufacture and makes assembly/disassembly of the component parts fast, easy and, reliable.

The above description is considered that of certain preferred embodiments only. Modifications of these embodiments may well occur to those skilled in the art and to those who make or use the invention. Therefore, it is to be understood that the embodiments shown in the drawings and described above are merely for illustrative purposes and are not intended to limit the scope of the invention, which is defined by the following claims as interpreted according to the principles of patent law, including the doctrine of equivalents.

The invention claimed is:

1. A surface-mounted light fixture for recreational vehicles and the like comprising:

a housing;

a lens having an annular rim including at least one extending tab portion;

a mounting bracket for a light-emitting element;

a switch for activating said light-emitting element;

a reflective plate for dispersing light generated by said light-emitting element, said reflective plate having perimeter edges, said perimeter edges having at least a pair of mutually spaced flange sections; and said housing having a plurality of tabs for mounting and retaining at least one of said reflective plate and said bracket in place, and further having at least one opening for receiving said at least one extending tab portion of said lens to mount said lens in place upon said housing, at least a pair of said plurality of tabs being mutually spaced and positioned for registering alignment with said pair of mutually spaced flange sections of said reflective plate perimeter edges, said registering aligned tabs and flange sections being configured to engage and interfit with one another to mount said reflective plate upon said housing in mutually fixed relation.

2. A surface-mounted light fixture according to claim 1, wherein said plurality of housing tabs further include:

a set of tabs including a resilient tab and at least one fixed tab integral to said housing, said set of tabs adapted to engage and retain said at least one of said reflective plate and bracket.

3. A surface-mounted light fixture according to claim 1, wherein said plurality of housing tabs further comprise:

a second set of tabs including a resilient tab and at least one fixed tab integral to said housing, said second set of tabs adapted to engage and retain said light-emitting element mounting bracket.

4. A surface-mounted light fixture according to claim 3, wherein said resilient tab is configured to abuttingly engage said mounting bracket so as to at least partially retain said bracket in place.

5. A surface-mounted light fixture according to claim 3, wherein said mounting bracket for a light-emitting means includes a projecting tongue and at least one of said tabs in said second set thereof defines a space for receiving said tongue.

6. A surface-mounted light fixture according to claim 5, wherein said resilient tab is configured to abuttingly engage said mounting bracket so as to at least partially retain said bracket in place.

7. A surface-mounted light fixture according to claim 6, wherein said resilient tab is resiliently deflectable to release its engagement with said mounting bracket.

8. A surface-mounted light fixture according to claim 1, wherein said housing comprises a shell having an annular wall, a generally flat recessed portion inside said annular wall, and a raised portion situated adjacent at least one side of said generally flat recessed portion, and wherein said plurality of tabs are formed integrally with said generally flat surface of said recessed portion.

9. A surface-mounted light fixture according to claim 8, wherein said annular wall defines a rim around the perimeter of said light fixture and said recessed portion has a generally flat outer surface and an angled sidewall between said flat surface and said rim and said raised portion.

10. A surface-mounted light fixture according to claim 8, wherein said generally flat surface of said recessed portion has a plurality of apertures each adapted to receive a fastener for securing said housing to a mounting surface.

11. A surface-mounted light fixture according to claim 8, wherein said raised portion of said housing has a relatively flat outwardly facing surface having an opening that has perimeter edges sized to accommodate said switch.

12. A surface-mounted light fixture according to claim 11, wherein said switch has a base having flexible tabs that frictionally engage at least one of said edges of said opening and an annular rim that at least partially locates said switch with respect to said housing.

13. A surface-mounted light fixture according to claim 1, wherein said housing is molded from a polymeric material.

14. A surface-mounted light fixture according to claim 13, wherein said plurality to tables are molded integrally to said housing.

15. A surface-mounted light fixture according to claim 1, wherein said plurality housing tabs includes at least one resilient tab which is configured to abuttingly engage said mounting bracket so as to at least partially retain said bracket in place.

16. A surface-mounted light fixture according to claim 15, wherein said resilient tab is resiliently deflectable to release its engagement with said mounting bracket.

17. A surface-mounted light fixture for recreational vehicles and the like comprising:

a housing;

a lens having an annular rim including at least one extending tab portion;

a mounting bracket for a light-emitting element;

a switch for activating said light-emitting element;

a reflective plate for dispersing light generated by said light-emitting element, said reflective plate having a flat portion with perimeter edges, said perimeter edges having at least one flange sections;

said housing having a plurality of tabs for mounting and retaining said reflective plate and said bracket in place, and further having at least one opening for receiving said at least one extending tab portion of said lens to mount said lens in place upon said housing said at least one flange section of said reflective plate perimeter edges interfitting with at least some of said plurality of housing tabs to connect said reflective plate to said housing.

18. A surface-mounted light fixture according to claim 17, wherein said reflective plate has generally flat portions and further includes a first and second set of opposed flange sections, said first set of opposed flange sections extending upwardly and outwardly from said generally flat portions for light dispersion, and said second set of flange sections extending outwardly and downwardly from said generally flat portions for connecting said reflective plate to said first set of tabs.

19. A surface-mounted light fixture according to claim 18, wherein said reflective plate is made from a metal sheet.

* * * * *

UNITED STATES PATENT AND TRADEMARK OFFICE
CERTIFICATE OF CORRECTION

PATENT NO.   : 6,015,222
DATED        : January 18, 2000
INVENTOR(S)  : John W. Schindler It is certified that error appears in the above-identified patent and that said Letters Patent is hereby corrected as shown below:

Column 7, line 52;
"1 12" should be -- 112 --.

Column 7, line 58;
"1 18" should be -- 118 --.

Column 10, claim 14, line 2;
"to tables" should be -- of tabs --.

Column 10, claim 17, line 23;
"sections;" should be -- section; --.

Signed and Sealed this

Thirteenth Day of February, 2001

Attest:

NICHOLAS P. GODICI

Attesting Officer     Acting Director of the United States Patent and Trademark Office